United States Patent
Rozental

(10) Patent No.: US 10,359,937 B2
(45) Date of Patent: Jul. 23, 2019

(54) SYSTEM AND METHOD OF IMPLEMENTING A TABLE STORAGE SUPPORT SCHEME

(71) Applicant: SanDisk Technologies LLC, Plano, TX (US)

(72) Inventor: Roman Rozental, Natania (IL)

(73) Assignee: SANDISK TECHNOLOGIES LLC, Addison, TX (US)

(*) Notice: Subject to any disclaimer, the term of this patent is extended or adjusted under 35 U.S.C. 154(b) by 11 days.

(21) Appl. No.: 14/546,995

(22) Filed: Nov. 18, 2014

(65) Prior Publication Data
US 2015/0177988 A1    Jun. 25, 2015

Related U.S. Application Data

(60) Provisional application No. 61/919,609, filed on Dec. 20, 2013.

(51) Int. Cl.
| | | |
|---|---|---|
| G06F 3/06 | (2006.01) | |
| G06F 12/02 | (2006.01) | |
| G06F 9/46 | (2006.01) | |
| G06F 16/11 | (2019.01) | |
| G06F 16/23 | (2019.01) | |

(52) U.S. Cl.
CPC ............ G06F 3/0607 (2013.01); G06F 3/065 (2013.01); G06F 3/0679 (2013.01); G06F 9/466 (2013.01); G06F 12/0246 (2013.01); G06F 16/128 (2019.01); G06F 16/2308 (2019.01); G06F 16/2379 (2019.01); G06F 2221/0795 (2013.01)

(58) Field of Classification Search
None
See application file for complete search history.

(56) References Cited

U.S. PATENT DOCUMENTS

| | | | | |
|---|---|---|---|---|
| 5,448,718 | A * | 9/1995 | Cohn | G06F 11/1466 |
| | | | | 707/999.202 |
| 5,655,135 | A | 8/1997 | Sholander et al. | |
| 5,835,963 | A * | 11/1998 | Yoshioka | G06F 12/1054 |
| | | | | 365/49.17 |
| 7,047,386 | B1 * | 5/2006 | Ngai | G06F 9/5016 |
| | | | | 707/999.202 |
| 8,082,236 | B2 | 12/2011 | Aharonov et al. | |

(Continued)

OTHER PUBLICATIONS

"TCG Storage Application Note: Encrypting Drives Compliant with Opal SSC," Specification Version 1.00 Final, Revision 1.00, Feb. 19, 2010, 92 pages.

(Continued)

*Primary Examiner* — Sean D Rossiter
*Assistant Examiner* — Stephanie Wu
(74) *Attorney, Agent, or Firm* — Patterson & Sheridan, LLP; Steven Versteeg

(57) ABSTRACT

A data storage device may be configured to update a table used by a host device, such as a table stored at the data storage device. For, example, the data storage device may generate and store an updated version of a portion of the table. A storage location of the updated version of the portion may be tracked using a data structure that corresponds to a second version of the table. The second version of the table may be discarded or made accessible to the host device responsive to an indicator detected by the data storage device.

30 Claims, 6 Drawing Sheets

(56) References Cited

U.S. PATENT DOCUMENTS

| | | | |
|---|---|---|---|
| 8,112,595 B1 | 2/2012 | Bar-El | |
| 8,332,600 B2* | 12/2012 | Ito | G06F 11/1435 |
| | | | 711/161 |
| 8,566,686 B2 | 10/2013 | Krishnamurthy | |
| 8,656,380 B1* | 2/2014 | sgeirsson | G06F 11/3466 |
| | | | 717/158 |
| 8,819,367 B1* | 8/2014 | Fallone | G06F 11/1456 |
| | | | 711/162 |
| 9,009,437 B1* | 4/2015 | Bjornsson | G06F 3/0665 |
| | | | 370/389 |
| 9,531,809 B1* | 12/2016 | Brooker | G06F 17/30194 |
| 2002/0124130 A1* | 9/2002 | Iida | G06F 3/0607 |
| | | | 711/103 |
| 2003/0105768 A1* | 6/2003 | Berkowitz | G06F 17/30578 |
| 2003/0204603 A1* | 10/2003 | Buchanan | H04L 29/06 |
| | | | 709/228 |
| 2005/0021567 A1* | 1/2005 | Holenstein | G06Q 10/087 |
| 2006/0069885 A1* | 3/2006 | Matsui | G06F 11/1435 |
| | | | 711/154 |
| 2007/0156985 A1* | 7/2007 | Tsai | G06F 11/1435 |
| | | | 711/162 |
| 2008/0059751 A1* | 3/2008 | Nakamura | G06F 3/0608 |
| | | | 711/170 |
| 2008/0120304 A1* | 5/2008 | Calio | G06F 17/3038 |
| 2008/0270694 A1* | 10/2008 | Patterson | G06F 3/0617 |
| | | | 711/114 |
| 2008/0288819 A1* | 11/2008 | Heller, Jr. | G06F 9/3004 |
| | | | 714/19 |
| 2009/0094427 A1* | 4/2009 | Sano | G06F 11/2069 |
| | | | 711/162 |
| 2009/0193218 A1* | 7/2009 | Tamura | G06F 3/0613 |
| | | | 711/170 |
| 2010/0153660 A1* | 6/2010 | Lasser | G06F 12/0246 |
| | | | 711/154 |
| 2010/0235335 A1* | 9/2010 | Heman | G06F 17/30345 |
| | | | 707/703 |
| 2011/0004724 A1* | 1/2011 | Jo | G06F 12/0246 |
| | | | 711/103 |
| 2011/0082963 A1* | 4/2011 | Jeddeloh | G06F 11/141 |
| | | | 711/103 |
| 2012/0042376 A1 | 2/2012 | Dolgunov et al. | |
| 2013/0018849 A1* | 1/2013 | Johnston | G06F 17/30309 |
| | | | 707/687 |
| 2013/0024682 A1 | 1/2013 | Dolgunov et al. | |
| 2013/0159812 A1 | 6/2013 | Loh et al. | |
| 2013/0219138 A1* | 8/2013 | Nasu | G06F 3/0608 |
| | | | 711/162 |
| 2013/0282666 A1* | 10/2013 | McGee | G06F 17/30581 |
| | | | 707/683 |
| 2013/0311992 A1* | 11/2013 | Fuente | G06F 11/1484 |
| | | | 718/1 |
| 2014/0101394 A1* | 4/2014 | Johri | G06F 12/00 |
| | | | 711/154 |
| 2014/0149698 A1* | 5/2014 | Ezra | G06F 3/0614 |
| | | | 711/162 |
| 2014/0164828 A1* | 6/2014 | Banikazemi | G06F 11/1471 |
| | | | 714/15 |
| 2014/0168227 A1* | 6/2014 | Meixner | G06F 12/1045 |
| | | | 345/502 |
| 2014/0372710 A1* | 12/2014 | Bisht | G06F 12/1027 |
| | | | 711/143 |
| 2015/0032981 A1* | 1/2015 | Kawada | G06F 11/2064 |
| | | | 711/162 |
| 2015/0046413 A1* | 2/2015 | Andrei | G06F 17/30309 |
| | | | 707/695 |
| 2015/0134621 A1* | 5/2015 | Ki | G06F 17/30115 |
| | | | 707/689 |
| 2016/0267015 A1* | 9/2016 | Li | G06F 12/10 |

OTHER PUBLICATIONS

"TCG Storage Application Note: Encrypting Storage Devices Compliant with Enterprise SSC," Specification Version 1.00 Final, Revision 1.00, Dec. 21, 2009, 90 pages.

* cited by examiner

SYSTEM AND METHOD OF IMPLEMENTING A TABLE STORAGE SUPPORT SCHEME

REFERENCE TO PRIOR APPLICATIONS

This application claims the benefit of U.S. Provisional Patent Application No. 61/919,609 filed Dec. 20, 2013, which is herein incorporated by reference in its entirety.

FIELD OF THE DISCLOSURE

The present disclosure is generally related to implementing a table storage support scheme.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data. For example, a solid state drive (SSD) may store large audio files, images, videos, and other files.

A data storage device may include a non-volatile memory storing a table, such as a byte table, for use by a host device. To update the table, a transaction scheme may be used that applies updates to the table and, after the updates are performed, commits (e.g., saves) or aborts (e.g., discards) the updates. For example, in a typical transaction scheme, the data storage device generates a copy of the table to be used as an updateable table. The data storage device can modify the updateable table based on one or more update requests received from the host device. The data storage device may receive a commit indicator or an abort indicator after the updateable table has been modified.

To accommodate a non-nested update transaction or a nested update transaction, the data storage device reserves memory resources (e.g., storage space) to be allocated to support multiple versions of the table regardless of a size of a portion of the table that is updated. Accordingly, when the table is large in size, such as one or more megabytes, the data storage device reserves several megabytes of storage space for the multiple versions of the table. Additionally, copying the table to generate the updateable table may be a time consuming operation. When the table is large (e.g., several megabytes or more) a copying operation may take several seconds, during which time the data storage device may be inaccessible to the host device. Problems associated with storage space and the time associated with the copying operation may be compounded for nested transactions.

SUMMARY

Techniques are disclosed for a table storage support scheme. The table storage support scheme may be used to update a first version of a table used by a host device. The data storage device may store the first version of the table and may generate and store an updated version of a portion of the table based on a table update request. Based on a storage location of the updated version of the portion, the data storage device may update a data structure to indicate the storage location of the updated version of the portion. The data structure may be smaller than the size of the table. After updating the data structure, the data structure may identify a second version of the table that is different than the first version of the table. In some implementations, the data storage device may divide the table into multiple portions and may reserve a portion of a logical memory address space to enable storage of multiple versions of each portion of the table (e.g., without having to reserve physical memory blocks to enable storage of multiple versions of the table).

When the data storage device receives one or more table update requests from the host device (e.g., a transaction that includes a sequence of one or more table updates), the data storage device may update the first version of the table to generate a second version of the table by updating individual pages of the table without generating a copy of non-updated pages of the table. To generate the second version of the table, the data storage device may generate a second data structure by copying the first data structure and making updates to the second data structure to track updates (e.g., modifications) to the table. A storage size of each of the first data structure and the second data structure may be significantly smaller than the size of the table. After generating the second version of the table, the first version of the table or the second version of the table may be selected to be used, while the other version is discarded, based on whether the data storage device receives an abort indicator or a commit indicator from the host device.

By updating individual portions of the table (rather than copying all portions of the table) and using a data structures that is significantly smaller than the size of the table, the data storage device is able to use less physical memory space as compared to a data storage device that uses multiple copies of the table to generate an updated table. Additionally, because the data structure is smaller in size than the table, an amount of time to create a copy of the data structure is less than an amount of time to generate a copy of the table. Accordingly, the table storage support scheme uses fewer resources and more efficiently updates a table than a table update scheme that generates multiple copies of a table to create an updated table.

DETAILED DESCRIPTION

Particular embodiments of the present disclosure are described below with reference to the drawings. In the description, common features are designated by common reference numbers throughout the drawings.

Figure 1:
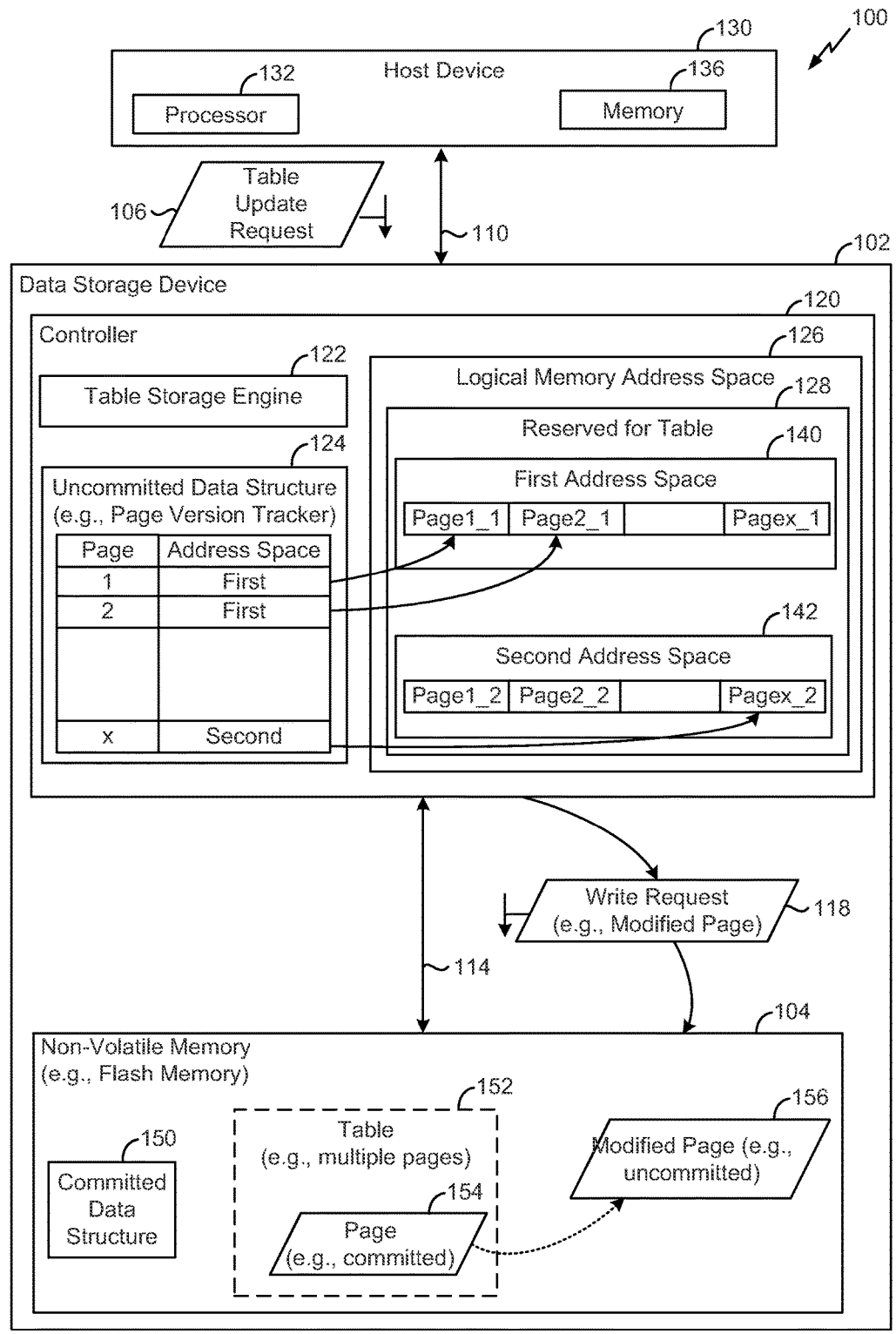
FIG. 1 is a block diagram of a particular illustrative embodiment of a system including a data storage device that uses a table storage support scheme.

FIG. 1 is a block diagram of a particular illustrative embodiment of an electronic device 100 including a data storage device 102 and a host device 130. The data storage device 102 may store and update a table that is accessible to the host device 130 based on a table storage support scheme.

The table storage support scheme, such as a byte table storage support scheme, may be used to update a table (e.g. a table 152), such as a byte table, used by the host device 130. For example, the table 152 may be updated based on a non-nested update transaction or based on a nested update transaction. The table storage support scheme may comply with one or more Trusted Computing Group (TCG) standards, such as a TCG OPAL standard. The table storage support scheme may be applied to store the table 152 at a non-volatile memory 104 of the data storage device 102 and may be used for different exchange protocols used to communicate between the host device 130 and the data storage device 102. The table storage support scheme may be applicable for use with a table having a large table size (e.g., greater than a megabyte), may support transactions that are committed or aborted, and/or may support nested transactions (e.g., as defined by a standard, such as a TCG standard).

When the data storage device 102 uses (e.g., implements) the table support storage scheme, the data storage device 102 may divide the table 150 into multiple portions, such as multiple pages, as an illustrative, non-limiting example. For example, a byte table that is 128 megabytes may be divided into 1,024 pages that are each 128 kilobytes. The data storage device 102 may reserve a portion 128 of a logical memory address space 126 (e.g., contiguous logical block addresses) to enable storage of multiple versions of each portion (e.g., each page) of the table 152. For example, a first portion 140 of the logical memory address space 126 may be large enough to enable storage of a first version of each page of the table 152 and a second portion 142 of the logical memory address space 126 may be large enough to enable storage of a second version of each page of the table 152. While the data storage device 102 may reserve the portion 128 of logical memory address space 126 to enable storage of multiple versions of each page of the table 152, the data storage device 102 does not need to reserve physical regions (e.g., memory blocks of the non-volatile memory 104) to enable storage of multiple versions of the table 152.

The data storage device 102 may use one or more data structures, such as one or more data tables, to identify (e.g., point to) a corresponding portion (of the logical memory address space 126) for each page of the table 152. For example, a first data structure may identify, for each page of a table, whether the page is associated with the first portion 140 of the logical memory address space 126 or with the second portion 142 of the logical memory address space 126.

In response to the data storage device 102 receiving one or more table update requests from the host device 130 (e.g., a transaction that includes a sequence of one or more table updates), the data storage device 102 may update the first version of the table 152 to generate a second version of the table 152 by updating individual pages of the table 152 without generating a copy of non-updated pages of the table 152. To generate the second version of the table 152, the data storage device 102 may generate a second data structure by copying the first data structure and making updates to the second data structure to track updates (e.g., modifications) to the table 152. For example, the first data structure may be associated with a committed data structure 150 and the second data structure may be associated with an uncommitted data structure 124. A storage size of each of the first data structure and the second data structure may be significantly smaller than the size of the table.

After receiving the one or more table update requests and generating the second version of the table 152, the data storage device 102 may receive a commit indicator or an abort indicator from the host device 130. In response to the data storage device 102 receiving the commit indicator, the first version of the table 152 becomes obsolete, the second version (e.g., the updated version) of the table 152 may be made available to the host device 130, and the first data structure is discarded (as well as previous versions of pages of the table 152 that were updated during the transaction) and the second data structure is stored in a memory of the data storage device 102, such as a memory included in a controller 120 of the data storage device 102. To enable the second version of the table 152 to be used by the host device 130, the data storage device 130 may store the second data structure (e.g., corresponding to the second version of the table 152), such as storing the second data structure at the non-volatile memory 104 of the data storage device 102. In response to the data storage device 102 receiving the abort indicator, the second version of the table 152 becomes obsolete, the first version of the table 152 remains available to the host device 130, and the second data structure is discarded (as well as the updated (e.g., modified) versions of pages of the table 152 that were updated during the transaction).

By updating individual pages of the table 152 (rather than copying all pages of the table 152) and using one or more data structures that are each significantly smaller than the size of the table, the data storage device 102 is able to use less physical memory space as compared to a data storage device that uses multiple copies of the table to generate an updated table. Additionally, because the data structure (e.g., the committed data structure 150 or the uncommitted data structure 124) is smaller in size than the table 152, an amount of time to create a copy of the data structure is less than an amount of time to generate a copy of the table 152. Accordingly, the table storage support scheme uses fewer resources and more efficiently updates a table than a table update scheme that generates multiple copies of a table to create an updated table.

The data storage device 102 may be coupled to the host device 130 via a communication path 110, such as a wired communication path and/or a wireless communication path. The data storage device 102 may be embedded within the host device 130, such as in accordance with an embedded MultiMedia Card (eMMC®) (trademark of Joint Electron Devices Engineering Council (JEDEC) Solid State Technology Association, Arlington, Va.) configuration. Alternatively, the data storage device 102 may be removable from (i.e., "removably" coupled to) the host device 130. For example, the data storage device 102 may be removably coupled to the host device 130 in accordance with a removable universal serial bus (USB) configuration.

The host device 130 may include a processor 132 and a memory 136. The memory 136 may be configured to store data and/or instructions that may be executable by the processor 132. Although the memory 136 is illustrated as a single memory, the memory 136 may include one or more memories, such as one or more non-volatile memories, one or more volatile memories, or a combination thereof.

The host device 130 may issue one or more commands to the data storage device 102, such as one or more requests to read data from or write data to a memory of the data storage device 102. The host device 130 may include a mobile telephone, a music player, a video player, a gaming console, an electronic book reader, a personal digital assistant (PDA), a computer, such as a laptop computer, a notebook computer, or a tablet, any other electronic device, or any combination thereof. The host device 130 may communicate via a host controller, which may enable the host device 130 to read data from and to write data to the data storage device 102. The host device 130 may operate in compliance with a JEDEC Solid State Technology Association industry specification, such as an embedded MultiMedia Card (eMMC) specification or a Universal Flash Storage (UFS) Host Controller Interface specification. The host device 130 may operate in compliance with one or more other specifications, such as a Secure Digital (SD) Host Controller specification, as an illustrative, non-limiting example. The host device 130 may communicate with the data storage device 102 in accordance with another communication protocol. For example, the host device 130 and the data storage device 102 may operate in compliance with one or more Trusted Computing Group (TCG) standards, such as a TCG OPAL standard, as an illustrative, non-limiting example.

To further illustrate, the data storage device 102 may be configured to be coupled to the host device 130 as embedded memory, such as in connection with an eMMC configuration, as an illustrative, non-limiting example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, such as one or more TCG standards, or a combination thereof.

The data storage device 102 is configured to store one or more versions of a table 152 that is accessible to the host device 130. For example, the table 152 may be a master boot record associated with an operating system, a security table for an operating system, or other data table used by the host device 130, as illustrative, non-limiting examples. The data storage device 102 may store and maintain (e.g., update) the table 152 in compliance with one or more standards, such as one or more Trusted Computing Group (TCG) standards (e.g., a TCG OPAL standard). The table 152 may have a large table size (e.g., greater than a megabyte). As an illustrative example, the table 152 may be a byte table having a fixed size, such as 128 megabytes. The data storage device 102 may update the table in response to one or more table update requests received from the host device 130, as described further herein.

The data storage device 102 includes a controller 120 and a non-volatile memory 104. The controller 120 may be coupled to the non-volatile memory 104 via a bus 114, an interface, another structure, or a combination thereof. The non-volatile memory 104 may include a solid state drive (SSD). For example, the non-volatile memory 104 may include a flash memory (e.g., a NAND flash memory or a NOR flash memory). In other implementations, the non-volatile memory 104 may include an erasable programmable read-only memory (EPROM), an electrically-erasable programmable read-only memory (EEPROM), a read-only memory (ROM), a one-time programmable memory (OTP), a resistive random-access memory (ReRAM), another type of memory, or a combination thereof.

The non-volatile memory 104 may include a committed data structure 150 and one or more versions of the table 152. The data storage device 102 may store the table 152 in the non-volatile memory 104 as multiple pages including a representative page 154. For example, the table 152 may be divided into multiple pages having the same size, such as a same length (e.g., a same number of bits). When the table 152 is a byte table, each page may include the same number of bytes. To illustrate, if the table 152 is 128 megabytes, the table 152 may be divided into 1,024 pages that each include 128 kilobytes (e.g., 1 megabyte include 1,024 kilobytes and 1 kilobyte includes 1024 bytes). As depicted in FIG. 1, the multiple pages of a first version of the table 152 may occupy a single portion of the non-volatile memory 104. Alternatively, the table 152 may include (e.g., may be a collection of) multiple pages that are stored into various locations throughout the non-volatile memory 104.

The committed data structure 150 (e.g., a first data structure) may be used to identify locations in the non-volatile memory 104 of the multiple pages of the first version of the table 152 that is accessible to the host device 130. For example, only one version (e.g., a committed version) of the table 152 may be available for use by the host device 130 at a time, and the committed data structure 150 may correspond to the committed version of the table 152. The committed data structure 150 may be significantly smaller than the table 152. The committed data structure 150 may be configured as a table or other data structure to map the multiple pages of the table 152 to different locations of the non-volatile memory 104, as described further herein. For example, the committed data structure 150 (e.g., the first data structure) may identify, for each page of a table 152, a portion of a logical memory address space 126 associated with the page. Although the committed data structure 150 is depicted in FIG. 1 as being stored in the non-volatile memory 104, the committed data structure 150 may be stored in another location (e.g., a designated storage location) included in or coupled to the data storage device 102.

The non-volatile memory 104 may store one or more modified pages of the table 152, such as a representative modified page 156. The modified page 156 may be associated with an updated version (e.g., a second version) of the table 152, as described further herein. For example, an update to the table 152 may include reading the page 154 of the table 152, modifying the page 154 to generate the modified page 156, and storing the modified page 156 into the non-volatile memory 104 at a different location than where the page 154 is stored. The second version of the table 152 resulting from the update to the table 152 may include the modified page 156 and other pages of the first version of the table 152 that were not modified. The second version (e.g., the updated version) of the table 152 may not be accessible for use by the host device 130 (e.g., the second version of the table 152 is uncommitted). The second version of the table 152 may replace the first version of the table 152 and become a "committed" version (e.g., a version accessible to and usable by the host device 130) responsive to a particular command received at the data storage device 102, as described further herein.

The controller 120 may receive data and commands (e.g., instructions) from the host device 130 and may send data to the host device 130. The controller 120 may send data and commands to the non-volatile memory 104 and may receive data from the non-volatile memory 104. For example, the controller 120 may send one or more write commands and/or one or more read commands to the non-volatile memory 104. As another example, the controller 120 may receive one or more table update requests, such as a table update request 106, associated with the table 152 stored at the non-volatile memory 104. The one or more table update requests may include one or more read-modify-write requests and may be associated with generating one or more versions of the table 152, as described further herein.

The controller 120 may include a table storage engine 122, an uncommitted data structure 124, and a logical memory address space 126. The logical memory address space 126 (e.g., contiguous logical block addresses) may include a reserved portion 128 associated with the table 152. The reserved portion 128 may enable the data storage device 102 to store multiple versions of each page of the table. While the data storage device 102 may reserve the portion of logical memory address space 126 to enable storage of multiple versions of each page of the table 152, the data storage device 102 does not need to reserve physical memory blocks to enable storage of multiple version of the table 152.

The reserved portion 128 may include multiple sub-portions, such as a first sub-portion 140 (e.g., a first address space) and a second sub-portion 142 (e.g., a second address space). Each sub-portion of the multiple sub-portions may be associated with a corresponding logical block address range. A number of addresses in each sub-portion of the multiple sub-portions may be the same as a number of pages in the table. The first sub-portion 140 of the logical memory address space 126 may be large enough to store a first version of each page of the table 152 and a second sub-portion 142 of the logical memory address space 126 may be large enough to store a second version of each page of the table 152. To illustrate, the table 152 may be divided into a plurality of "x" pages (e.g., x is a positive integer), and each of the first sub-portion 140 and the second sub-portion 142 may be configured to support x pages. For example, the first sub-portion 140 may include a first page address space (page1_1), a second page address space (page2_1), and an $x^{th}$ page address space (pagex_1). The second sub-portion 142 may include a first page address space (page1_2), a second page address space (page2_2), and an $x^{th}$ page address space (pagex_2). Although the first sub-portion 140 and the second sub-portion 142 are illustrated as including address space for three pages, each of the first sub-portion 140 and the second sub-portion 142 may include less than three page address spaces or more than three address pages spaces. Additionally, the first sub-portion 140 and the second sub-portion may have a same number of page address spaces or a different number of page address spaces. The multiple sub-portions of the reserved portion 128 may be used by the controller 120 to generate and track one or more modified versions of the pages of the table 152, as described further herein. Although the reserved portion 128 is illustrated as a single portion of the logical memory address space 126, the reserved portion 128 may include discontinuous portions of the logical memory address space 126. For example, the first sub-portion 140 may be discontinuous with respect to the second portion 142.

The uncommitted data structure 124 (e.g., a second data structure) may be used to identify page locations in the non-volatile memory 104 of a second version of the table 152. Prior to being updated to identify the second version of the table 152, the uncommitted data structure 124 (e.g., the second data structure) may be created as a copy of the committed data structure 150 (e.g., the first data structure) or as a copy of another uncommitted data structure (not shown). To generate the second version of the table 152, one or more updates may be made to the uncommitted data structure 124 to track modifications (e.g., updates) to one or more pages of the table 152. For example, the uncommitted data structure 124 may be configured to track one or more locations of pages of the table 152 that have been modified (e.g., updated), such as a location of the representative modified page 156. The uncommitted data structure 124 may be significantly smaller than the table 152. The second version of the table 152 is not accessible to be used by the host device 130 until the second version of the table 152 is instructed to be "committed," as described further herein.

The uncommitted data structure 124 may be configured as a table or other data structure configured to map the multiple pages of the second version of the table 152 to different storage locations of the non-volatile memory 104. For example, the uncommitted data structure 124 may include an entry for each page of the multiple pages of the table 152. Each entry may include a corresponding page number and a corresponding pointer that identifies one of the multiple sub-portions of the logical memory address space 126. To illustrate, when the table 152 is divided into "x" pages, the uncommitted data structure 124 may include x entries, such as a first entry, a second entry, and an $x^{th}$ entry. The first entry may correspond to a first page of the multiple pages of the table 152 and may point to the first sub-portion 140 (e.g., to indicate that a location of the first page in the non-volatile memory 104 may be determined using a location indicated by the first page address space (page1_1) of the first sub-portion 140). The second entry of the uncommitted data structure 124 may correspond to a second page of the multiple pages of the table 152 and may point to the first sub-portion (e.g., to indicate that a location of the second page in the non-volatile memory 104 may be determined using a location indicated by the second page address space (page2_1) of the first sub-portion 140). The $x^{th}$ entry of the uncommitted data structure 124 may correspond to an $x^{th}$ page of the multiple pages of the table 152 and may point to the second sub-portion 142 (e.g., to indicate that a location of the $x^{th}$ page in the non-volatile memory 104 may be determined using a location indicated by the an $x^{th}$ page address space (pagex_2) of the second sub-portion 142).

The table storage engine 122 may implement a table storage support scheme to store and update the table 152. The table storage support scheme may be used with different exchange protocols used to enable communication between the host device 130 and the data storage device 102, may support transactions that are committed or aborted (e.g., a series of one or more table update requests that are accepted or discarded to create an updated version of the table 152), and/or may support nested transactions, such as nested transactions as defined by one or more TCG standards.

The table storage engine 122 may use the table storage support scheme to generate an updated version of the table 152, such as an updated version of the table 152 based on a non-nested update transaction, as described with reference to FIG. 3, or based on a nested update transaction, as described with reference to FIG. 4. A transaction to generate a modified version of the table 152 may include one or more table update requests (e.g., one or more table update operations) that are tied together in the sense that if the transaction fails to close (e.g., because an abort indicator is received from the host device 130) because of a failure of any one of the table update operations, or because of a power loss before the transaction is closed, none of the table updates performed during the transaction may be deemed valid.

Accordingly, if the transaction is not closed the data storage device 102 continues to use a version of the table 152 that existed prior to any of table update operations of the transaction being performed.

The one or more table operations performed during the transaction can be used to generate a new version of the table 152 that is usable by the host device 130. For example, the table storage engine 122 may be configured to store a first version (e.g., the committed version) of the table 152 and to generate the second ("updated") version (e.g., the uncommitted version) of the table 152.

The table storage engine 122 may be configured to receive one or more table update requests, such as the table update request 106, from the host device 130. For example, the table update request 106 may be included in a transaction (e.g., a transaction that includes a sequence of one or more table updates) initiated by the host device 130. To illustrate, the host device 130 may initiate the transaction with the data storage device 102 and, during the transaction, the data storage device 102 may receive the table update request 106 from the host device 130. The table update request 106 may cause the table storage engine 122 to generate an updated version of the table 152 (e.g., generate the second version of the table 152). For example, the table storage engine 122 may update one or more individual pages of the table 152 without generating a copy of non-updated pages of the table 152. The transaction may be closed responsive to a close command, such as a commit command or an abort command, received from the host device, as described further herein.

The table update request 106 may identify a table to be updated, an operation to be performed on the table, and/or a portion of the table to be updated (e.g., an offset value from a beginning of the table). When the table identified by the table update request 106 is a byte table, the table update request 106 may include a byte table update request. The byte table update request may identify the byte table, an operation to be performed on the byte table, a byte of the byte table (e.g., as a byte value or as an offset (byte) value from a beginning of the byte table), and a number of bytes to be updated (e.g., a length of an update).

The table storage engine 122 may determine a page of the table 152 to be updated, such as the page 154, based on the table update request 106. For example, the table storage engine 122 may parse the table update request 106 to identify an offset value from a beginning of the table and may determine the page 154 of the table 152 that corresponds to the offset value. When the table update request 106 is a byte table request that includes an offset value from a beginning of the table 152, the table storage engine 122 may translate the offset value into a page value that corresponds to a page of the table 152 to be updated. To illustrate, if the table 152 is divided into 1,024 pages that each include 128 kilobytes and the offset value is 130 (kilobytes), the table storage engine 122 may determine the table update request 106 corresponds to a page value of 2 (e.g., a second page of the table 152).

The table storage engine 122 may be configured to access the uncommitted data structure 124 to determine a first location (at the non-volatile memory 104) of the page 154 and may further determine a second location (at the non-volatile memory 104) where the modified version (e.g., the modified data) of the page 154 is to be stored. For example, the first location may be identified using a particular sub-portion of the multiple sub-portions that is pointed to by the entry in the uncommitted data structure 124 for the page 154.

To determine the second location, the table storage engine 122 may use the multiple sub-portions in a cyclically sequential manner based on a sequential order. For example, the table storage engine 122 may arrange and use the multiple sub-portions of the reserved portion 128 in a sequential order. To illustrate, when the multiple sub-potions include the first sub-portion 140 and the second sub-portion 142, the table storage engine 122 may arrange the first sub-portion 140 and the second sub-portion 142 in the sequential order such that the first sub-portion 140 is prior to the second sub-portion 142. Based on a received table update request, the table storage engine 122 may use the uncommitted data structure 124 to identify a first location that is associated with a particular sub-portion of the reserved portion 128. The table storage engine 122 may determine the second location based on a next sub-portion (of the reserved portion 128) which sequentially follows after the particular sub-portion based on the sequential order). For example, when the first sub-portion 140 is prior to the second sub-portion 142 based on the sequential order, the table storage engine 122 uses the uncommitted data structure 124 to identify that the first sub-portion 140 is associated with a first location of a particular page of the table 152 to be modified. Accordingly, based on the sequential order, the table storage engine 122 may determine the second location using the second sub-portion 142 (which sequentially follows the first sub-portion 140 based on the sequential order).

When the particular sub-portion is a last sequential sub-portion (of the reserved portion 128) based on the sequential order, the method may operate in a cyclical manner and the next sub-portion may be a first sub-portion (of the reserved portion 128) based on the sequential order. For example, when the multiple sub-potions include two sub-portions (e.g., the first sub-portion 140 being sequentially first based on a sequential order and the second sub-portion 142 being sequentially last based on the sequential order), the table storage engine 122 uses the uncommitted data structure 124 to identify that the second sub-portion 142 is associated with a first location of a particular page of the table 152 to be modified. Accordingly, based on the sequential order, the table storage engine 122 may determine the second location using the first sub-portion 140 (which is cyclically next after the second sub-portion 142 based on the sequential order).

In a particular illustrative example, when the multiple sub-portions of the reserved portion 128 are arranged according to a sequential order (e.g., the first sub-portion 140 being sequentially first based on the sequential order and the second sub-portion 142 being sequentially second based on the sequential order), the table storage engine 122 determines that the table update request 106 corresponds to a page value of 2 and may identify an entry of the uncommitted data structure 124 corresponding to the second page (e.g., the page 154). Based on the uncommitted data structure 124, the table storage engine 122 may determine that the first location of the page 154 may be identified using the first sub-portion 140 of the logical memory address space 126. The table storage engine 122 may access the first sub-portion 140 to identify the first location of the page 154 in the non-volatile memory 104 based on the second page address space (page2_1) of the first sub-portion 140. The table storage engine 122 may send a read request to the non-volatile memory 104 to read data stored at the first location (e.g., data corresponding to the page 154). The table storage engine 122 may receive data from the first location of the non-volatile memory 104 and modify the data based on the table update request 106 to generate a modified version (e.g., an updated version) of the page 154. The table storage engine 122 may further determine a second location (at the non-volatile memory 104) where the modified version (e.g., the modified data) of the page 154 is to be stored. For example, the second location may be associated with the second page address space (page2_2) of the second sub-portion 142 (e.g., the second sub-portion being a sequential next sub-portion of the logical memory address space 126). The table storage engine 122 may send the write request 118, including the modified version of the page 154, to the non-volatile memory 104 to write the modified version of the page 154 into the second location. The modified version of the page 156 may be stored into the non-volatile memory 104 at the second location as the modified page 156.

The table storage engine 122 may update the uncommitted data structure 124 based on the modified page 156 being stored into the second location of the non-volatile memory 104. For example, when the modified page 156 (e.g. the second page) is stored at the second location indicated by the second sub-portion 142, the entry of the uncommitted data structure 124 corresponding to the second page may be updated to point to the second sub-portion 142. Thus, the table storage engine 122 may update the first version of the table 152 to generate a second version (e.g., the updated version) of the table 152 by updating individual pages of the table 152 and without generating a copy of non-updated pages of the table 152. Additionally, the table storage engine 122 may track locations of the updated pages of the table 152 using the uncommitted data structure 124. Accordingly, the data storage device 102 may use less space to generate an updated version of the table 152 as compared to a data storage device that copies the entire table 152 to generate the updated version of the table.

In a particular illustrative embodiment, a particular table update request may be associated with a particular page of the table 152 that has no corresponding data stored in the non-volatile memory 104. When the particular page has no corresponding data stored in the non-volatile memory 104, an entry for the particular page in the uncommitted data structure 124 may have a null value (e.g., the entry does not point to one of the multiple sub-portions of the reserved portion 128). When the table storage engine 122 receives the particular table update request to store data at the particular page, the table storage engine 122 may identify the null value of the entry in the uncommitted data structure 124 for the particular page and may store the data at a location of the non-volatile memory 104 based on a predetermined sub-portion of the reserved portion 128, such as a sub-portion that is sequentially first based on a sequential order (e.g., the first sub-portion 140). The table storage engine 122 may update the entry (of the particular page) of the uncommitted data structure 124 to point to the first sub-portion 140 after the data is stored in the location in the non-volatile memory 104.

After the table update request 106 is received and/or after the updated version of a particular page of the table 152 is stored, the data storage device 102 may receive a commit indicator (e.g., a commit command) or an abort indicator (e.g., an abort command) from the host device 130. The commit indicator or the abort indicator may be associated with a close of the transaction that included the table update request 106. The table storage engine 122 may accept or discard the second version of the table 152, as indicated by the uncommitted data structure 124, based on whether the commit indicator or the abort indicator is received from the host device 130. For example, when the data storage device 102 receives the abort indicator, the second version of the table 152 becomes obsolete, the first version of the table remains available to the host device 130, and the uncommitted data structure 124 (e.g., the second data structure) is discarded (as well as the updated (e.g., modified) versions of pages of the table that were updated during the transaction). When the commit indicator is received, the table storage engine 122 may process the second version of the table 152 and/or the uncommitted data structure 124 based on whether the transaction is a non-nested transaction or a nested transaction.

When the transaction closed by the commit indicator is a non-nested transaction, the uncommitted data structure 124 (e.g., the second data structure) may be stored in a memory of the data storage device 102 to enable the second version (e.g., the updated version) of the table 152 to be used by the host device 130. To enable the second version of the table 152 to be accessed and used by the host device 130, the table storage engine 122 may store the uncommitted data structure 124 (e.g., corresponding to the second version of the table 152), such as storing the uncommitted data structure 124 at a memory of the controller 120 or at the non-volatile memory 104. To illustrate, storing the uncommitted data structure 124 at the non-volatile memory 104 may replace the committed data structure 150 with the uncommitted data structure 124 (e.g., the committed data structure may be discarded as well as previous versions of pages of the table that were updated during the transaction) and the uncommitted data structure 124 may then be used as a "committed" data structure. Accordingly, by storing the uncommitted data structure 124 and making the second version of the table 152 usable to the host device 130, the data storage device 102 renders the first version of the table 152 obsolete, the second version (e.g., the updated version) of the table 152 is made available to the host device 130, and the committed data structure 150 (e.g., the first data structure) is discarded while the uncommitted data structure 124 (e.g., the second data structure) is stored in a memory of the data storage device 102.

When the transaction closed by the commit indicator is a nested transaction, the uncommitted data structure 124 may be stored at a memory of the controller 120, as further described with reference to FIG. 2. For example, the uncommitted data structure 124 corresponding to the second version of the table 152 may be used as part of another transaction, such as a non-nested transaction, and may be used to support additional updates to the second version of the table 152.

During operation of the data storage device 102, the controller 120 may receive the table update request 106 from the host device 130. The table update request 106 may be associated with a particular page of the table 152 and may be associated with an operation (e.g., an update operation) to be performed on the particular page. Based on the table update request 106, the controller 120 may perform the operation, such as a read-modify-write operation, to generate and store an updated version of the particular page. For example, the controller 120 may store the updated version of the particular page at a storage location of the non-volatile memory 104.

The controller 120 may update a data structure, such as the uncommitted data structure 124, based on the storage location of the updated version of the particular page. For example, the uncommitted data structure 124 may be updated by causing a pointer corresponding to the particular page to point to a particular sub-portion of the logical memory address space 126 that identifies the storage location of the updated version of the particular page. After updating the uncommitted data structure 124, the uncommitted data structure 124 may correspond to (e.g., identify) a second version of the table 152 that is different than the first version of the table 152.

By using the uncommitted data structure 124 and the committed data structure 150, multiple versions of the table 152 may be stored in the non-volatile memory and a particular version of the table 152 may be stored in a fragmented manner (e.g., not continuous). Additionally, a second version of the table 152 stored in the non-volatile memory may include pages of the first version of the table 152 that are stored in the non-volatile memory 104 and that are at a same location for both the first version and the second version. Further, by using the table storage support scheme along with the uncommitted data structure 124, the data storage device 102 may modify one or more pages of a first version of the table 152 to generate a second version of the table 152, without having to create a copy of the first version of the table 152. Additionally, by using the uncommitted data structure 124, the data storage device 102 is able to use less memory space as compared to a data storage device that uses two copies of the table to generate an updated table. Accordingly, the table storage support scheme uses fewer resources and more efficiently updates a table than a table update scheme that generates multiple copies of a table to create an updated table.

Figure 2:
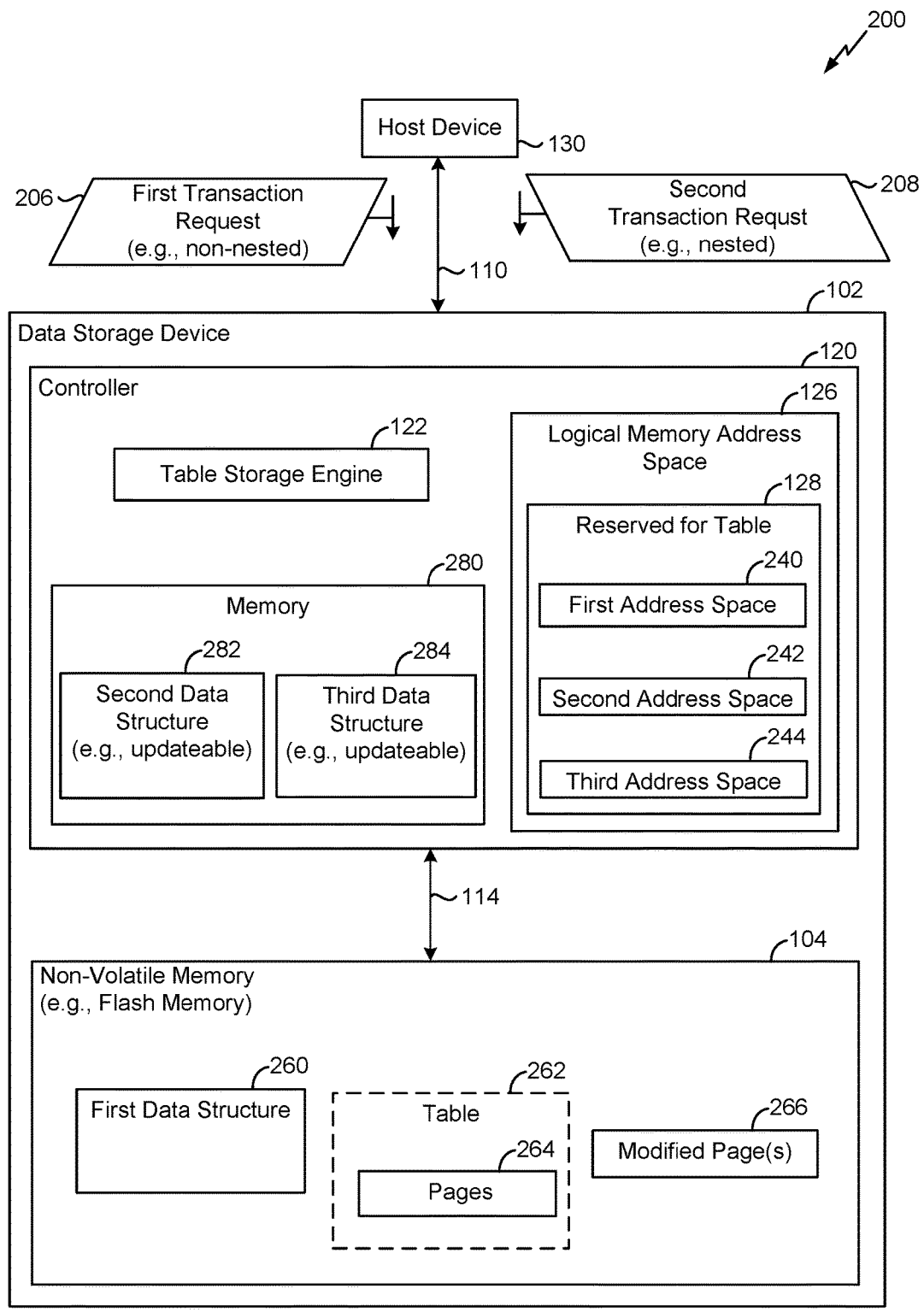
FIG. 2 is a block diagram illustrating a particular embodiment of components that may be incorporated in the data storage device of FIG. 1.

Referring to FIG. 2, a particular illustrative embodiment of the data storage device 102 of FIG. 1 showing additional detail of the non-volatile memory 104 and the controller 120 is depicted. The data storage device 102 of FIG. 2 may be configured to execute one or more nested transactions.

The data storage device 102 may be coupled to the host device 130 and may be configured to receive one or more transaction requests from the host device 130. Each transaction of the one or more transactions may include a sequence of one or more corresponding table update requests, such as the table update request 106 of FIG. 1. Each transaction of the one or more transactions may be independently closed to commit (e.g., accept) or abort (e.g., discard) the updates made during the transaction. For example, the controller 120 of the data storage device 120 may be configured to open a first transaction and to open a second transaction.

The non-volatile memory 104 may include a first data structure 260 and one or more versions of the table 262. The table 262 may include or correspond to the table 152 of FIG. 1. The first data structure 260 may be a "committed" data structure that identifies a first version of the table 262 that is accessible and usable by the host device 130. For example, the first data structure 260 may include or correspond to the committed data structure 150 of FIG. 1. The first data structure 260, such as a data table or other structure, may be configured to identify a corresponding portion and/or sub-portion (of the logical memory address space 126) for each page of the table 262.

The table 262 may be stored in the non-volatile memory 104 as multiple pages. For example, the first version of the table 262 may include multiple pages 264. The table 262 may include (e.g., may be a collection of) the multiple pages 264 that are stored into various locations throughout the non-volatile memory 104. One or more additional versions of the table 262 may include one or more modified pages 266.

The controller 120 may include the table storage engine 122, a memory 280, and the logical memory address space 126. The logical memory address space 126 (e.g., contiguous logical block addresses) may include the reserved portion 128 associated with the table 262. The reserved portion 128 may include multiple sub-portions, such as a first sub-portion 240 (e.g., a first address space), a second sub-portion 242 (e.g., a second address space), and a third sub-portion 244 (e.g., a third address space). The multiple sub-portions 240-244 may be associated with a sequential order and may be used cyclically by the table storage engine 122, as described with reference to the multiple sub-portions 140-142 of FIG. 1.

The memory 280 of the controller 120 may be included in a single memory component or may correspond to multiple distinct memory components and/or multiple different types of memory components. For example, all or part of the memory 280 may correspond to a random access memory (RAM) or a high-speed cache. All or part of the memory 280 may correspond to another type of memory, such as a non-volatile memory included in the controller 120. The memory 280 may include one or more data structures, such as a second data structure 282 and a third data structure 284. The one or more data structures may be generated and/or updated to support multiple versions of the table 262. For example, each of the one or more data structures may correspond to a version of the table 262. To illustrate, the second data structure 282 may be associated with a second version of the table 262 and the third data structure 284 may be associated with a third version of the table 262. Each of the second data structure 282 and the third data structure 284 may be significantly smaller than the table 262.

The table storage engine 122 may receive one or more transaction requests from the host device 130. For each transaction request received, the table storage engine 122 may open a corresponding transaction and assign a data structure stored at the memory 280 to the transaction when the transaction is opened. The table storage engine 122 may receive a non-nested transaction request and may open a non-nested transaction (e.g., a non-nested transaction session that is not nested with another transaction). When the non-nested transaction session is active (e.g., open), the table storage engine 122 may receive a nested transaction request and may open a nested transaction (e.g., a nested transaction session). The nested transaction may be "nested" within the non-nested transaction in that the nested transaction is opened after the non-nested transaction is opened and the nested transaction is closed prior to closing the non-nested transaction. Another aspect of the nested transaction being "nested" within the non-nested transaction is that modifications made to the table 262 during the nested transaction may be applicable to the non-nested transaction depending on whether the nested transaction is closed based on a commit indicator or an abort indicator. When the nested transaction is closed based on the commit indicator, the modifications to the table 262 are applicable the non-nested transaction and, when the nested transaction is closed based on the abort indicator, the modifications to the table 262 are not applicable to the non-nested transaction. When multiple transactions (e.g., the non-nested transaction and the nested transaction) are concurrently open, the table storage engine 122 may identify a particular transaction as an active transaction and may designate (assign) a particular data structure to be an active data structure (e.g., an updateable data structure) while the particular transaction is active. A particular data structure that is designated (e.g., identified) as the active data structure may be used to track one or more modifications to the table (e.g., identify a particular version of the table 262) that are made during a particular transaction that is designated as the active transaction.

To illustrate, the table storage engine 122 may receive the first transaction request 206 (e.g., a non-nested transaction request), open a first transaction, and identify (e.g., use) the first transaction as the active transaction. The table storage engine 122 may assign the second data structure 282 to the first transaction and may identify (e.g., use) the second data structure 282 as the active data structure. For example, when the table storage engine 122 receives the first transaction request 206, the table storage engine 122 may copy the first data structure 260 to the memory 280 to generate the second data structure 282 and may assign the second data structure 282 to the first transaction. Alternatively, the table storage engine 122 may copy the first data structure 260 to the memory 280 to generate the second data structure 282 prior to receiving the first transaction request 206 and, upon receiving the first transaction request 206, may assign the second data structure 282 to the first transaction. When the first transaction is the active transaction and the second data structure 282 is the active data structure, modifications to the table 262 are reflected in the second data structure 282.

When the table storage engine 122 receives the second transaction request 208 (e.g., a nested transaction request) during the first transaction, the table storage engine 122 may open a second transaction and may identify the second transaction as the active transaction. In response to receiving the second transaction request 208 (e.g., the nested transaction request), the table storage engine 122 may generate the third data structure 284, may assign the third data structure 284 to the second transaction, and may designate the third data structure 264 as the active data structure. To illustrate, when the table storage engine 122 receives the second transaction request 208, the table storage engine 122 may copy the second data structure 282 to generate the third data structure 284 in the memory 280. The table storage engine 122 may open the second transaction and may assign the third data structure 284 to the second transaction. When the second transaction is the active transaction and the third data structure 284 is the active data structure, modifications to the table 262 are reflected in the third data structure 284. Accordingly, when the second transaction is the active transaction and the third data structure 284 is the active data structure, changes made to the third data structure 284 are not made to the second data structure 282, and the third data structure 284 and the second data structure 282 each correspond to different versions of the table 262.

The table storage engine 122 may close the second transaction responsive to receiving a commit indicator or an abort indicator associated with the second transaction. When the table storage engine 122 closes the second transaction, the table storage engine 122 may designate (e.g., assign) the first transaction as the active transaction. When the abort indicator is received to close the second transaction, the version of the table 262 generated during the second transaction is discarded (e.g., the third data structure 284 is obsolete). Because the version of the table 262 generated during the second transaction is discarded, the table storage engine 122 may revert to the second data structure 282 and may identify the second data structure 282 as the active data structure based on the abort indicator associated with the second transaction being closed. When the commit indicator is received to close the second transaction, the version of the table 262 generated during the second transaction may be accepted, the third data structure 284 may be used when the first transaction is identified as the active transaction after the close of the second transaction based on the commit indicator, and the second data structure 282 may be discarded.

When the first transaction is the active transaction after the close of the second transaction, table update requests executed during the active transaction may be implemented on the version of the table 262 corresponding to the active data structure and may be tracked using the active data structure. The table storage engine 122 may close the first transaction (e.g., the active transaction) responsive to a commit indicator or an abort indicator associated with the first transaction. In response to closing the first transaction, the table storage engine 122 may identify a resultant data structure (e.g., a "committed" data structure) that identifies a corresponding version of the table 262 to be used by the host device 130. For example, when the abort indicator is received to close the first transaction, the version of the table 262 corresponding to the active data structure becomes obsolete and the active data structure may be discarded. Accordingly, when the abort indicator is received to close the first transaction, the active data structure is discarded and the first data structure 260 is identified as the resultant data structure and maintained in the non-volatile memory 104 to identify a version of the table 262 to be accessed and used by the host device 130.

When the commit indicator is received to close the first transaction, the active data structure may be identified as the resultant data structure and may be stored in the non-volatile memory 104 to identify a version of the table 262 including one or more of the modified pages 266 to be used by the host device 130. To illustrate, when the commit indicator is received to close the first transaction, the active data structure replaces the first data structure 260 stored in the non-volatile memory 104 as a particular data structure that identifies a version of the table 262 to be used by the host device 130.

During operation, the data storage device 102 may store the first data structure 260 corresponding to a first version of the table 262. The first data structure 260 may be a "committed" data structure and may be used to identify a particular version of the table 262 that is accessible to and usable by the host device 130.

The controller 120 may receive the first transaction request 206 and may generate a copy of the first data structure 260 in the memory 280 to create the second data structure 282. Responsive to the first transaction request 206, the controller 120 may open the first transaction, may identify the first transaction as the active transaction, and may identify the second data structure 282 as the active data structure (e.g., an updateable data structure). When the first transaction is the active transaction and the second data structure 282 is the active data structure, one or more modified pages (of the table 262) created during the active transaction may be identified in the second data structure 282.

When the first transaction is the active transaction, the controller 120 may receive the second transaction request 208. In response to the second transaction request 208, the controller 120 may generate a copy of the active data structure (e.g., the second data structure 282) in the memory 280 to create the third data structure 284. Responsive to the second transaction request 208, the controller 120 may open the second transaction, may identify the second transaction as the active transaction, and may identify the third data structure 284 as the active data structure. When the second transaction is the active transaction and the third data structure 284 is the active data structure, one or more modified pages (of the table 262) created during the active transaction (e.g., the second transaction) may be identified in the third data structure 284.

The controller 120 may close the second transaction responsive to receiving a commit indicator or an abort indicator when the second transaction (e.g., the nested transaction) is the active transaction. Responsive to closing the second transaction, the controller 120 may close the second transaction and identify the first transaction as the active transaction. The controller 120 may identify one of the second data structure 282 or the third data structure 284 to be the active data structure based on whether the commit indicator or the abort indicator is received to close the second transaction. If the commit indicator is received, the third data structure 284 may be maintained as the active data structure and, if the abort indicator is received, the second data structure 282 may be identified as the active data structure.

The controller 120 may close the first transaction responsive to receiving a commit indicator or an abort indicator when the first transaction (e.g., the non-nested transaction) is the active transaction. The controller 120 may close the first transaction and may identify one of the active data structure or the first data structure 260 as a resultant data structure to be used by the host device 130. The controller 120 may select one of the active data structure or the first data structure 260 as the resultant data structure based on whether the commit indicator or the abort indicator is received to close the first transaction. If the abort indicator is received, the first data structure 260 may be maintained as the resultant data structure and, if the commit indicator is received, the active data structure may be assigned as the resultant data structure (e.g., the active data structure is stored in the non-volatile memory 104 and replaces the first data structure 260).

Although, the data storage device 102 is described as supporting one nested transaction (e.g., the second transaction), the data storage device may support more than one nested transactions. To illustrate, when the second transaction is the active transaction and the third data structure 284 is the active data structure, the controller 120 may open a third transaction (e.g., a nested transaction that is nested within the second transaction), may identify the third transaction as the active transaction, may copy the third data structure 284 to generate a fourth data structure, and may identify the fourth data structure as the active data structure. When the third transaction is closed, the second transaction may be assigned as the active transaction and one of the fourth data structure or the third data structure 284 may be assigned as the active data structure.

By identifying one of the data structures of the memory 280 as the active data structure during each assigned active transaction, the data storage device 102 may support one or more nested transactions. Because the data structures 282, 284 are significantly smaller than the table 262, the data storage device 102 is able to use less memory space to generate multiple versions of the table 262 as compared to a data storage device that uses multiple copies of the table to generate an updated table.

Figure 3:
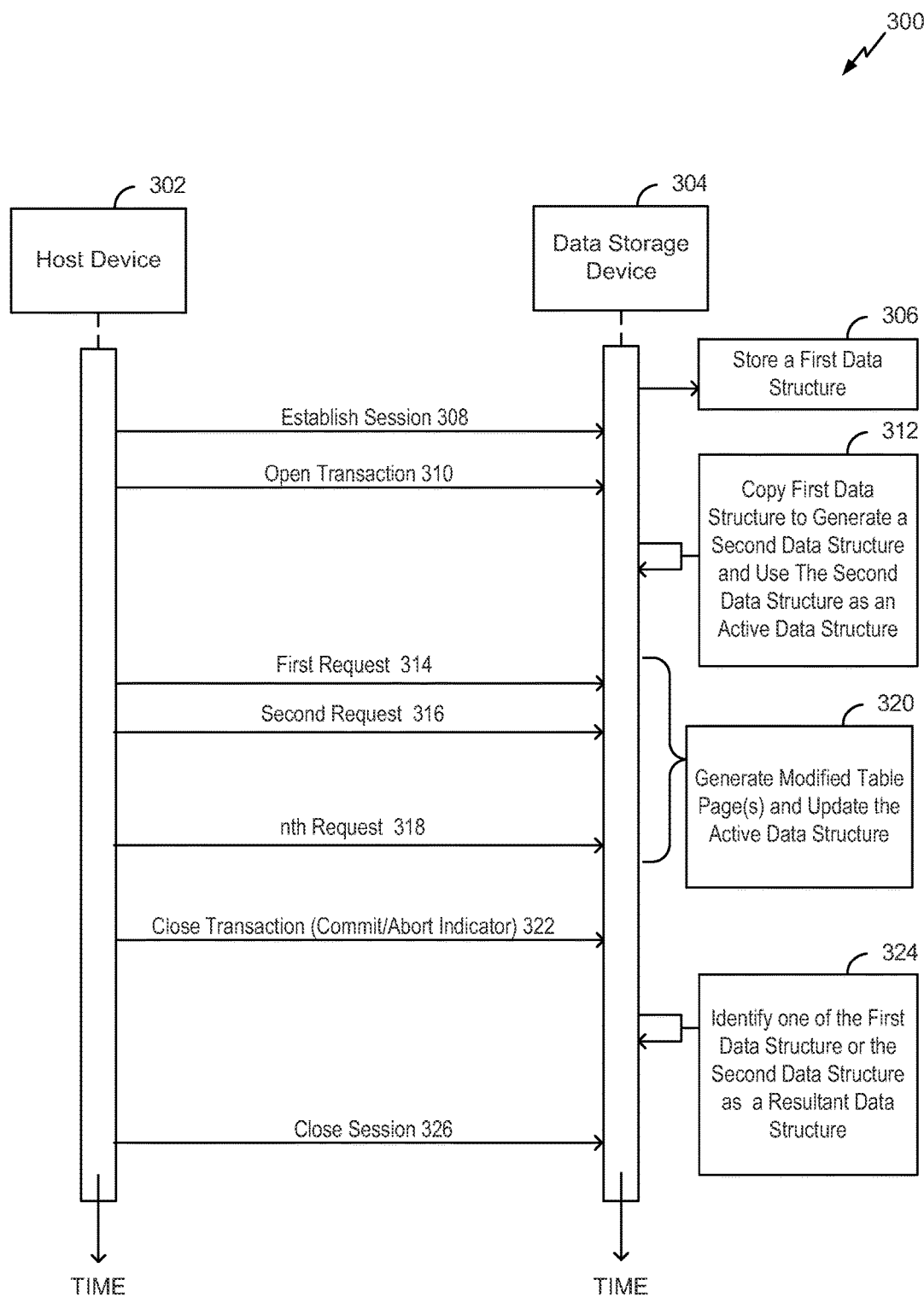
FIG. 3 is a ladder diagram to illustrate a first illustrative method of updating a byte table stored at data storage device.

Referring to FIG. 3, a first illustrative embodiment of a method 300 of communicating between a representative host device 302 and a representative data storage device 304 is shown. The method 300 is illustrated by a ladder diagram. The method 300 may be used to update a table based on an update transaction (e.g., a non-nested update transaction). The table may be used by the host device 302 and may be stored at the data storage device 204. For example, the host device 302 and the data storage device 304 may include or correspond to the host device 130 and the data storage device 102 of FIG. 1, respectively.

The data storage device 304 may store a first data structure, at 306. The first data structure may identify a first version of a table, such as the table 152 of FIG. 1 or the table 262 of FIG. 2. The first data structure may include or correspond to the committed data structure 150 of FIG. 1 and/or the first data structure 260 of FIG. 2. The first data structure may be significantly smaller than the table.

The host device 302 may establish a communication session with the data storage device 304, at 308. During the communication session, the host device 302 may initiate a transaction to be opened with the data storage device 304, at 310. The host device 302 may initiate the transaction to be opened by sending an open transaction command to the data storage device 304. The transaction may be associated with or correspond to a transaction that includes the table update request 106 of FIG. 1 and/or the first transaction request 206 of FIG. 2.

In response to the transaction being opened, the data storage device 304 may copy the first data structure to generate a second data structure and may use the second data structure as an active data structure, at 312. For example, the second data structure may include or correspond to the uncommitted data structure 124 of FIG. 1 and/or the second data structure 282 of FIG. 2. The second data structure may be significantly smaller than the table.

During the transaction, the data storage device 304 may receive one or more table update requests from the host device 302, such as a first table update request, at 314, a second table update request, at 316, and an $n^{th}$ table update request, at 318. Although the transaction is described with reference to FIG. 3 as including three table update requests, the transaction may include less than three or more than three table update requests. Based on the table update requests, the data storage device 304 may generate one or more modified table pages and may update the active data structure to identify a storage location of each of the modified table pages, at 320. By updating the active data structure to identify the storage location of each of the modified table pages, the active data structure may be used to identify a second version of the table.

The host device 302 may initiate a close of the transaction, at 322. The host device 302 may initiate the close of the transaction by sending a close transaction command to the data storage device 304. The close transaction command may include a commit indicator or an abort indicator. In response to the commit indicator or the abort indicator, the data storage device 304 may close the transaction and may use one of the first data structure or the second data structure as a resultant data structure, at 324. For example, when the data storage device 304 receives the abort indicator, the first data structure may be identified as the resultant data structure. Alternatively, when the data structure receives the commit indicator, the second data structure (e.g., the active data structure) may be identified as the resultant data structure. The resultant data structure may be stored at the data storage device 304 and may be accessible to be used by the host device 302. The communication session may be closed, at 326.

The method 300 provides a method of generating multiple versions of the table without creating multiple copies of unmodified pages of the table. By creating a copy of the first data structure to track one or more modified pages of the table (and one or more unmodified pages), the data storage device 304 may create a second version of the table without having to create an entire copy the table. Because the first data structure and the second data structure are smaller in size than the table, the first data structure and the second data structure may enable the data storage device 304 to support multiple versions of the table using less memory space as compared to a data storage device that uses two copies of the table to generate multiple versions of the table.

Figure 4:
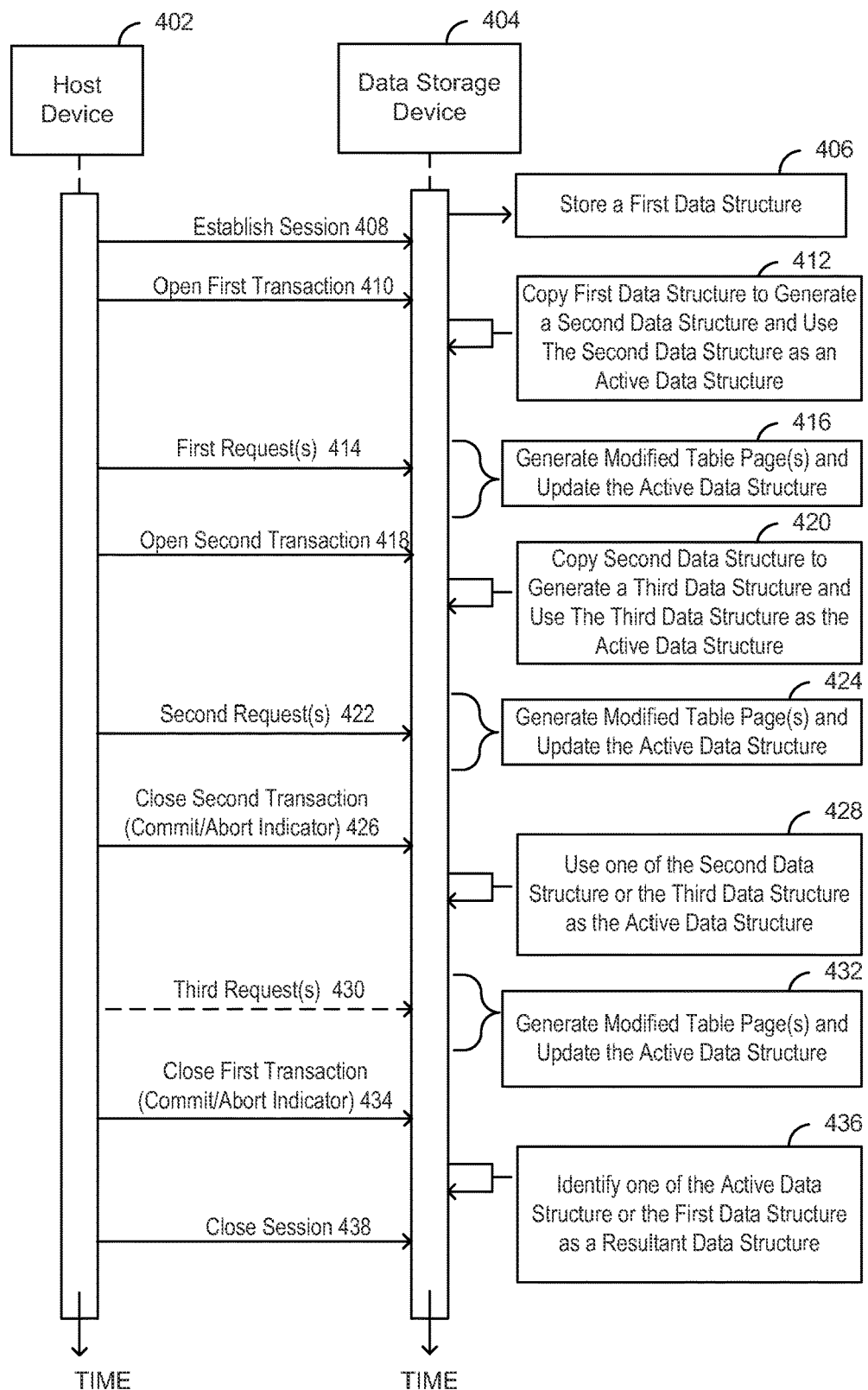
FIG. 4 is a ladder diagram to illustrate a second illustrative method of updating a byte table stored at data storage device.

Referring to FIG. 4, a second illustrative embodiment of a method 400 of communicating between a representative host device 402 and a representative data storage device 404 is shown. The method 400 is illustrated by a ladder diagram. The method 400 may be used to update a table based on at least one update transaction (e.g., nested update transaction). The table may be used by the host device 402 and stored at the data storage device 404. For example, the host device 402 and the data storage device 404 may include or correspond to the host device 130 and the data storage device 102 of FIG. 1, or the host device 302 and the data storage device 304 of FIG. 3, respectively.

The data storage device 404 may store a first data structure, at 406. The first data structure may identify a first version of a table, such as the table 152 of FIG. 1 or the table 262 of FIG. 2. The first data structure may include or correspond to the committed data structure 150 of FIG. 1 and/or the first data structure 260 of FIG. 2. The first data structure may be significantly smaller than the table.

The host device 402 may establish a communication session with the data storage device 404, at 408. During the communication session, the host device 402 may initiate a first transaction to be opened with the data storage device 404, at 410. The first transaction may be associated with or correspond to a transaction including the table update request 106 of FIG. 1 and/or the first transaction request 206 of FIG. 2.

In response to the first transaction being opened, the data storage device 404 may copy the first data structure to generate a second data structure and may use the second data structure as an active data structure, at 412. For example, the second data structure may include or correspond to the uncommitted data structure 124 of FIG. 1 and/or the second data structure 282 of FIG. 2. The second data structure may be significantly smaller than the table.

During the first transaction, the data storage device 404 may receive one or more first table update requests from the host device 402, at 414. Based on the one or more first table update requests, the data storage device 304 may generate one or more modified table pages and may update the active data structure to identify a storage location of each of the modified table pages, at 416. By updating the active data structure to identify the storage location of each of the modified table pages, the second data structure may be used to identify a second version of the table.

The host device 402 may initiate a second transaction to be opened with the data storage device 404, at 418. The second transaction (e.g., a nested transaction) may be associated with or correspond to a transaction including the table update request 106 of FIG. 1 and/or the first second request 208 of FIG. 2. In response to the second transaction being opened, the data storage device 404 may copy the second data structure to generate a third data structure and may use the third data structure as the active data structure, at 420. For example, the third data structure may include or correspond to the uncommitted data structure 124 of FIG. 1 and/or the third data structure 284 of FIG. 2. The third data structure may be significantly smaller than the table.

During the second transaction, the data storage device 404 may receive one or more second table update requests from the host device 402, at 422. Based on the one or more second table update requests, the data storage device 304 may generate one or more modified table pages and may update the active data structure to identify a storage location of each of the modified table pages, at 424. By updating the active data structure to identify the storage location of each of the modified table pages, the third data structure may be used to identify a third version of the table.

The host device 402 may initiate a close of the second transaction, at 426. For example, the host device 402 may send a commit indicator or an abort indicator to the data storage device 404 to close the second transaction. In response to the commit indicator or the abort indicator, the data storage device 404 may close the second transaction and may identify one of the second data structure or the third data structure as the active data structure, at 428. When the second transaction is closed, the first transaction may be used as the active transaction.

After the second transaction is closed, the data storage device 404 may optionally receive one or more third table update requests (as indicated by the dashed line), at 430. When the data storage device 404 receives the one or more third table update requests, the data storage device 304 may generate one or more modified table pages based on the one or more third table update request and may update the active data structure to identify a storage location of each of the modified table pages, at 432.

The host device 402 may initiate a close of the first transaction, at 434. For example, the host device 402 may send a commit indicator or an abort indicator to the data storage device 404 to close the first transaction. In response to the commit indicator or the abort indicator, the data storage device 404 may close the first transaction and may identify one of the active data structure or the first data structure as a resultant data structure, at 436. For example, when the data storage device 404 receives abort indicator, the first data structure may be identified as the resultant data structure. Alternatively, when the data structure receives the commit indicator, the active data structure may be identified as the resultant data structure. The resultant data structure may be stored at the data storage device 404 and may be used by the host device 402. The communication session may be closed, at 438.

The method 400 provides a method of supporting one or more nested transactions opened at the data storage device 404. By using multiple data structures to support the one or more nested transactions, the data storage device may generate multiple versions of the table without creating multiple copies of unmodified pages of the table.

Figure 5:
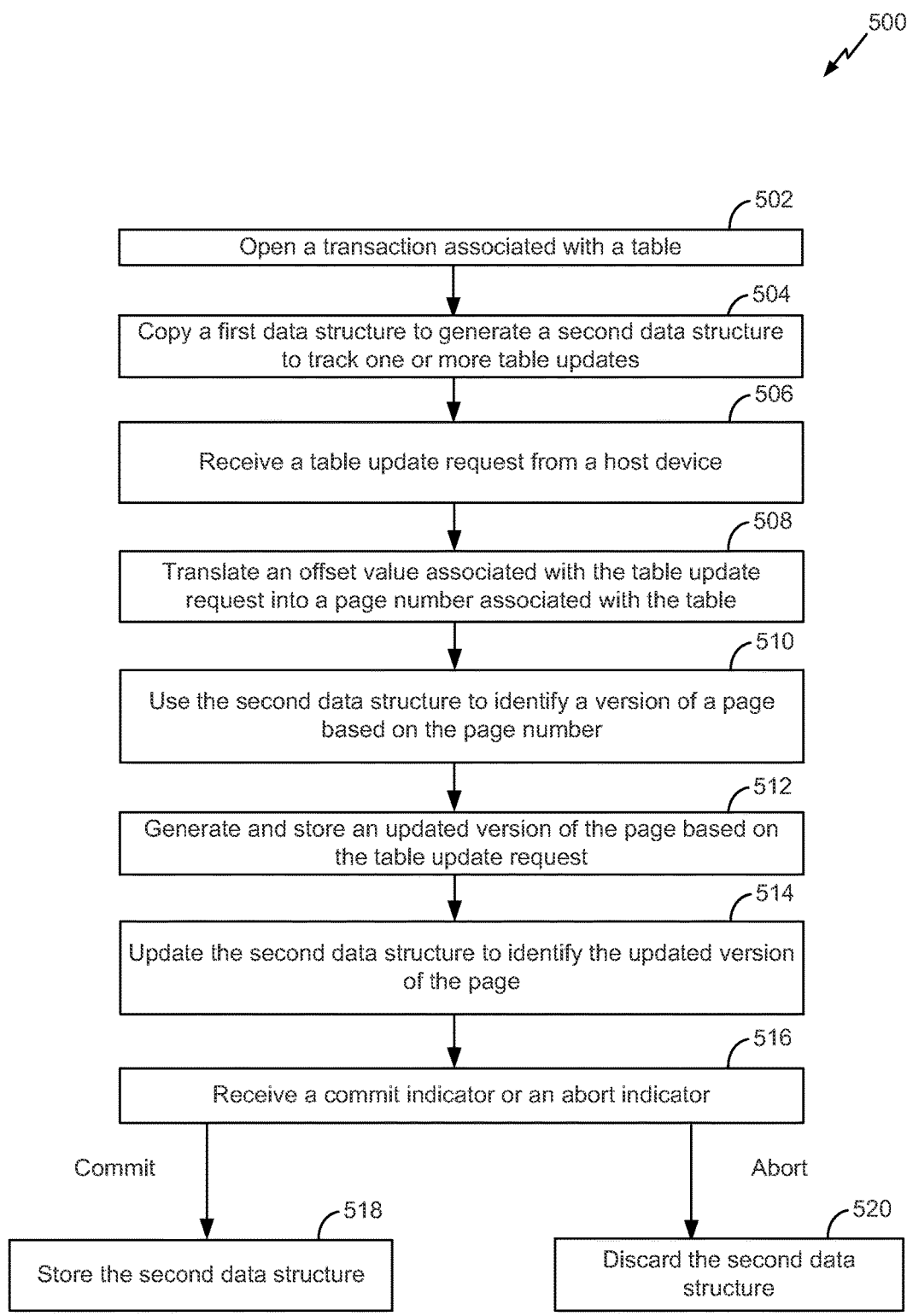
FIG. 5 is a flow diagram of a third illustrative method of updating a byte table stored at data storage device.

Referring to FIG. 5, a particular embodiment of a method 500 that may be performed at a data storage device to update a table used by a host device is depicted. For example, the method 500 may be associated with a table support scheme that is performed by a controller of the data storage device. For example, the method 500 may be performed by the controller 120 (e.g., at the table storage engine 122) of FIG. 1. The data storage device may include or correspond to the data storage device 102 of FIG. 1, the data storage device 304 of FIG. 3, or the data storage device 404 of FIG. 4. The table may include or correspond to the table 152 of FIG. 1 and/or the table 262 of FIG. 2.

The method 500 includes opening a transaction associated with the table, at 502. The data storage device may receive a request to open the transaction (e.g., an update sequence transaction) from the host device. For example, the host device may include or correspond to the host device 130 of FIG. 1, the host device 302 of FIG. 3, and/or the host device 402 of FIG. 4. The transaction may be associated with generating an updated version of the table. The data storage device stores the table as multiple pages. The data storage device may track a version of the table by storing a data structure having pointers to each page of the table. For example, a first data structure may correspond to a first version of the table.

The method 500 may also include copying the first data structure to generate a second data structure to track one or more table updates, at 504. The first data structure may include or correspond to the committed data structure 150 of FIG. 1 and/or the first data structure 260 of FIG. 2. The second data structure may correspond to a second version (e.g., the updated version) of the table. For example, the second data structure may include or correspond to the uncommitted data structure 124 of FIG. 1 and/or the second data structure 282 of FIG. 2.

The method 500 may further include receiving a table update request from the host device, such as a read-modify-write request, at 506. The table update request may identify the table, an operation to be performed on the table, an offset indicating a location in the table (e.g., as an offset (byte) value from a beginning of the table), and/or a number of bytes to be updated (e.g., a length of an update).

The method 500 may also include translating the offset value associated with the table update request into a page number associated with the table, at 508, and using the second data structure to identify a version of a page based on the page number, at 510. The version of the page may be associated with a first location of the non-volatile memory of the data storage device.

The method 500 includes generating and storing an updated version of the page based on the table update request, at 512. The data storage device may read data from the first location of the non-volatile memory, modify the data based on the operation identified in the update request (e.g., the request received from the host device) to generate modified data, and write the modified data to a second location of the non-volatile memory to store the updated version of the page.

The method 500 may also include updating the second data structure to identify the updated version of the page, at 514. For example, the second data structure may be updated so that a particular pointer for the page that was updated (e.g., modified) points to the second location.

The method 500 may further include receiving a commit indicator or an abort indicator, at 516. The commit indicator or the abort indicator may be received from the host device and may designate a close (e.g., a conclusion) of the transaction. When the data storage device receives the commit indicator, the method 500 may include storing the second data structure, at 518. The second data structure may be stored in the non-volatile memory of the data storage device and may be used by the host device to identify and access a second version (e.g., the updated version) of the table. When the data storage device receives the abort indicator, the method 500 discards the second data structure, at 520. When the second data structure is discarded, the data storage device continues to use the first data structure to identify the first version of the table to be used by the host device.

By creating a copy of the first data structure to track one or more modified pages of the table (and one or more unmodified pages), the method 500 enables the data storage device to create a second version of the table without having to create an entire copy the table.

Figure 6:
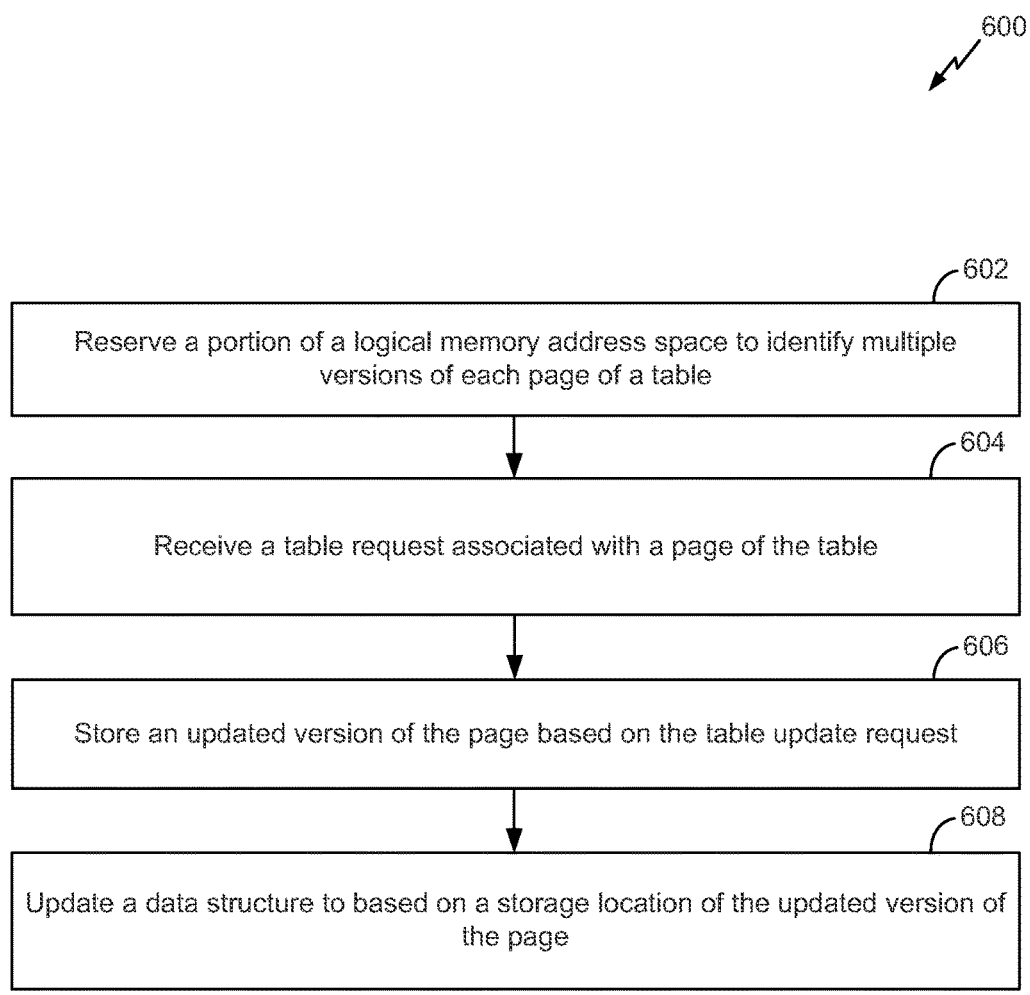
FIG. 6 is a flow diagram of a fourth illustrative method of updating a byte table stored at data storage device.

FIG. 6 illustrates a particular embodiment of a method 600 that may be performed at a data storage device, such as the data storage device 102 of FIG. 1. For example, the method 600 may be performed by the controller 120 (e.g., at the table storage engine 122) of FIG. 1. The data storage device may include or correspond to the data storage device 102 of FIG. 1, the data storage device 304 of FIG. 3, or the data storage device 404 of FIG. 4. The table may include or correspond to the table 152 of FIG. 1 and/or the table 262 of FIG. 2.

The method 600 includes reserving a portion of a logical memory address space to identify multiple versions of each page of a table, at 602. The portion of the logical memory address space may include or correspond to the reserved portion 128 of the logical memory address space 126 of FIG. 1. The table may include or correspond to the table 152 of FIG. 1 and/or the table 262 of FIG. 2.

The method 600 also includes receiving a table update request associated with a page of the table, at 604. The table update request may be received from a host device, such as the host device 130 of FIG. 1, the host device 302 of FIG. 3, or the host device 402 of FIG. 4. The table update request may be included in or correspond to a transaction, such as a non-nested transaction or a nested transaction. For example, the table update request may include or correspond to the table update request 106 of FIG. 1, the first transaction request 206 or the second transaction request 208 of FIG. 2.

The method 600 further includes storing an updated version of the page based on the table update request, at 606. The updated version of the page may be stored at a non-volatile memory of the data storage device, such as the non-volatile memory 104 of the data storage device 102 of FIG. 1.

The method 600 further includes updating a data structure based on a storage location of the updated version of the page, at 608. For example, an entry of the data structure that corresponds to the page may be updated to point to a sub-portion of the portion of the logical memory address space. The entry may be updated to point to the sub-portion to track a location of the updated version (e.g., a modified version) of the page within the non-volatile memory of the data storage device.

By updating the data structure to track one or more modified pages of the table (and one or more unmodified pages), the method 600 enables the data storage device to create a second version of the table without having to create an entire copy the table.

The method 300 of FIG. 3, the method 400 of FIG. 4, the method 500 of FIG. 5 and/or the method 600 of FIG. 6 may be initiated or controlled by a field-programmable gate array (FPGA) device, an application-specific integrated circuit (ASIC), a processing unit, such as a central processing unit (CPU), a digital signal processor (DSP), a controller, another hardware device, a firmware device, or any combination thereof. As an example, the method 300 of FIG. 3, the method 400 of FIG. 4, the method 500 of FIG. 5 and/or the method 600 of FIG. 6 can be initiated or controlled by one or more processors included in or coupled to the data storage device 102 of FIG. 1, such as one or more processors included in or coupled to the controller 120 of FIG. 1.

A controller configured to perform the method 300 of FIG. 3, the method 400 of FIG. 4, the method 500 of FIG. 5 and/or the method 600 of FIG. 6, may be able to advantageously maintain and update a table using a table storage support scheme. Although various components of the data storage device 102 depicted herein are illustrated as block components and described in general terms, such components may include one or more microprocessors, state machines, or other circuits configured to enable the controller 120 and/or the byte table storage engine 122 of FIG. 1 to perform operations described herein. One or more aspects of the controller 120 and/or the table storage engine 122 may be implemented using a microprocessor or microcontroller programmed to perform operations described herein, such as one or more operations of the method 300 of FIG. 3, the method 400 of FIG. 4, the method 500 of FIG. 5 and/or the method 600 of FIG. 6, or a combination thereof. In a particular embodiment, the controller 120 and/or the table storage engine 122 includes a processor executing instructions that are stored at the non-volatile memory 104. Alternatively or additionally, executable instructions that are executed by the processor may be stored at a separate memory location that is not part of the non-volatile memory 104, such as at a read-only memory (ROM).

The controller 120 and/or the byte table storage engine 122 of FIG. 1 may be implemented using a microprocessor or microcontroller programmed to perform the method 300 of FIG. 3, the method 400 of FIG. 4, the method 500 of FIG. 5 and/or the method 600 of FIG. 6. For example, the microprocessor or microcontroller may be configured to execute instructions (e.g., a series of instructions, such as an algorithm) to perform certain operations described herein. In a particular embodiment, the controller 120 and/or the table storage engine 122 (e.g., the microprocessor or microcontroller) includes a processor executing instructions that are stored at the non-volatile memory 104. Alternatively or alternatively, executable instructions that are executed by the processor may be stored at a separate memory location that is not part of the non-volatile memory 104, such as at a read-only memory (ROM).

In an illustrative example, the processor may execute the instructions to reserve a portion of a logical memory address space to identify multiple versions of each page of a table. The instructions to reserve the portion of the logical memory address space may include instructions to select the portion of the logical memory address space, instructions to divide the portion of the logical memory address space into multiple sub-portions, and/or instructions to divide each of the multiple sub-portions into multiple equally sized pages, as illustrative, non-limiting examples. The processor executes instructions to receive a table update request associated with a page of the table. The instructions to receive the table update request may include instructions to open a transaction, instructions to receive the table update request during the transaction, instructions to identify the received table update request, instructions to parse the table update request to identify an operation, and/or instructions to parse the table update request to identify a particular portion of the table to which the operation is to be applied, as illustrative, non-limiting examples. The processor may execute the instructions to store an updated version of the page based on the table update request. The instructions to store the updated version of the page may include instructions to identify a page of the table based on the table update request, instructions to determine a first location of the page in a non-volatile memory, instructions to request data stored at the first location, instructions to generate modified data, instructions to determine a second location in the non-volatile memory, and/or instructions to write the modified data into the second location, as illustrative, non-limiting examples. The processor may execute the instructions to update a data structure based on a storage location of the updated version of the page. The instructions to update the data structure may include instructions to select the data structure, instructions to identify a page number of the page, instructions to identify an entry of the data structure based on the page number, instructions to determine a value of a pointer of the entry, instructions to update the value of the pointer to be associated with the second location, and/or instructions to save the updated value of the pointer, as illustrative, non-limiting example.

In a particular embodiment, the data storage device 102 may be attached to, or embedded within, one or more host devices, such as within a housing of a portable communication device. For example, the data storage device 102 may be within a packaged apparatus such as a wireless telephone, a personal digital assistant (PDA), a gaming device or console, a portable navigation device, a computer device (e.g., a tablet or a laptop), or other device that uses internal non-volatile memory. However, in other embodiments, the data storage device 102 may be a portable device configured to be selectively coupled to one or more external devices. For example, the data storage device 102 may be a removable device such as a Universal Serial Bus (USB) flash drive or a removable memory card, as illustrative examples. In a particular embodiment, the non-volatile memory 104 includes a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The memory 104 of FIG. 1 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 104 may include another type of memory. The memory 104 of FIG. 1 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The illustrations of the embodiments described herein are intended to provide a general understanding of the various embodiments. The illustrations are not intended to serve as a complete description of all of the elements and features of apparatus and systems that utilize the structures or methods described herein. Other embodiments may be utilized and derived from the disclosure, such that structural and logical substitutions and changes may be made without departing from the scope of the disclosure. Although specific embodiments have been illustrated and described herein, it should be appreciated that any subsequent arrangement capable of achieving the same or similar purpose or functionality may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
    a memory configured to store:
        a table that includes a plurality of pages; and
        a first data structure including address information for a first page of the table, wherein the address information indicates the first page corresponds to a first set of logical addresses, wherein the first data structure includes address information for less than all of the plurality of pages; and
    a controller operatively coupled to the memory, wherein the controller is configured to:
        reserve multiple sets of logical addresses associated with the table to enable storage of multiple versions of the first page of the table, the multiple sets including the first set of logical addresses, a second set of logical addresses, and a third set of logical addresses;
        responsive to initiation of a transaction, generate a second data structure by copying the first data structure;
        update the second data structure to include updated address information corresponding to the first page of the table, wherein the updated address information indicates that the first page corresponds to the second set of logical addresses; and
        receive a commit indicator or an abort indicator, wherein the commit indicator makes a first version of the table obsolete and a second version of the table available to the host, wherein the second version of the table is an update of the first version of the table, wherein the abort indicator makes the second version of the table obsolete and the first version of the available to the host, and wherein the commit indicator processes the second version of the table based on whether a transaction is a non-nested transaction or a nested transaction.

2. The data storage device of claim 1, wherein the controller is further configured to update the first version of the table to generate the second version of the table based on an update to at least one page of the table, the second version of the table generated without generation of a copy of non-updated pages of the table, and wherein the second version of the table includes the update to the at least one page of the table and the non-updated pages.

3. The data storage device of claim 1, wherein:
    the table comprises a byte table,
    a table update request that corresponds to the transaction is received from a host device, and
    the table update request identifies a byte value of the byte table.

4. The data storage device of claim 1, further comprising a second memory included in the controller, wherein the second memory is configured to store the second data structure and is distinct from the memory.

5. The data storage device of claim 1, wherein the first page of the plurality of pages is associated with a corresponding page number.

6. The data storage device of claim 1, wherein:
    a table update request received during the transaction includes an offset value, and
    the controller is further configured to translate the offset value into a first page number and to modify the first page based on the table update request.

7. The data storage device of claim 1, wherein the controller is further configured to:
    open the transaction; and
    open a second transaction.

8. The data storage device of claim 7, wherein:
    the second transaction comprises a nested transaction, and
    the second transaction occurs during the transaction.

9. The data storage device of claim 1, wherein the memory stores a committed data structure that corresponds to the first version of the table.

10. The data storage device of claim 1, wherein the controller is further configured to:
    determine a first location of the first page in the memory in response to a table update request; and
    read the first page from the first location in the memory.

11. The data storage device of claim 1, wherein the controller is further configured to:
    modify the first page to generate an updated version of the first page; and
    write the updated version of the first page to a second location of the memory.

12. The data storage device of claim 1, wherein the controller is further configured to receive the commit indicator or the abort indicator from a host device.

13. The data storage device of claim 1, wherein the controller is further configured to:
    open the transaction that includes a table update request; and
    close the transaction.

14. The data storage device of claim 1, wherein the memory includes:
    a three-dimensional (3D) memory configuration that is monolithically formed in one or more physical levels of arrays of memory cells having an active area disposed above a silicon substrate; and
    circuitry associated with operation of the memory cells.

15. The data storage device of claim 1, wherein the controller is further configured to, after the second data structure is updated, determine whether to replace the first data structure with the updated second data structure.

16. The data storage device of claim 15, wherein:
    the controller is further configured to receive the commit indicator or the abort indicator from a host device, and
    a determination of whether to replace the first data structure with the updated second data structure is based on whether the controller received the commit indicator or the abort indicator.

17. The data storage device of claim 1, wherein the controller is further configured to, in response to receipt of the commit indicator, replace the first data structure with the updated second data structure.

18. The data storage device of claim 1, wherein the controller is further configured to, in response to receipt of the abort indicator, maintain the first data structure in the memory as a committed data structure of the table.

19. The data storage device of claim 1, wherein the controller is further configured to, during the transaction and after the second data structure is updated:
  open a second transaction; and
  generate a third data structure by copying the updated second data structure.

20. The data storage device of claim 19, wherein:
  the controller is further configured to, during the second transaction, update the third data structure to include second updated address information corresponding to the first page of the table, and
  the second updated address information indicates that the first page corresponds to the third set of logical addresses.

21. A method of managing a table, the method comprising:
  in a data storage device including a controller and a memory, wherein the memory stores a table that includes a plurality of pages, performing:
    responsive to initiation of a transaction, copying a first data structure to generate a second data structure, the first data structure including address information for a first page of the table, wherein the address information indicates the first page corresponds to a first set of logical addresses of multiple sets of logical addresses, wherein the first data structure includes address information for less than all of the plurality of pages;
    updating the second data structure to include updated address information corresponding to the first page of the table, wherein the updated address information indicates that the first page corresponds to a second set of logical addresses of the multiple sets of logical addresses;
    generating a third data structure including updated address information that indicates the first page corresponds to a third set of logical addresses of the multiple sets of logical addresses; and
    receiving a commit indicator or an abort indicator, wherein the commit indicator makes a first version of the table obsolete and a second version of the table available to the host, wherein the second version of the table is an update of the first version of the table, wherein the abort indicator makes the second version of the table obsolete and the first version of the table available to the host, and wherein the commit indicator processes the second version of the table based on whether a transaction is a non-nested transaction or a nested transaction.

22. The method of claim 21, wherein a table update request that identifies a byte value of the table is received from a host device, and further comprising determining a particular page associated with the table based on the byte value.

23. The method of claim 21, further comprising, after updating the second data structure, determining whether to replace the first data structure with the updated second data structure.

24. The method of claim 21, wherein each set of logical addresses of the multiple sets of logical addresses is associated with a corresponding logical block address range.

25. The method of claim 21, wherein the first set of logical addresses comprises a set of consecutive logical addresses.

26. The method of claim 21, wherein:
  the memory includes a three-dimensional (3D) memory configuration that is monolithically formed in one or more physical levels of arrays of memory cells having an active area disposed above a silicon substrate; and
  the data storage device includes circuitry associated with operation of the memory cells.

27. A device comprising:
  means for storing a table that includes a plurality of pages and for storing a first data structure including address information for a first page of the table, wherein the address information indicates the first page corresponds to a first set of logical addresses of multiple sets of logical addresses, wherein the first data structure includes address information for less than all of the plurality of pages;
  means for generating a second data structure as a copy of the first data structure responsive to initiation of a transaction;
  means for updating the second data structure to include updated address information corresponding to the first page of the table, wherein the updated address information indicates that the first page corresponds to a second set of logical addresses of the multiple sets of logical addresses;
  means for generating a third data structure as a copy of the updated second data structure and for updating the third data structure to include second updated address information that indicates the page corresponds to a third set of logical addresses of the multiple sets of logical addresses; and
  means for receiving a commit indicator or an abort indicator, wherein the commit indicator makes a first version of the table obsolete and a second version of the table available to the host, wherein the second version of the table is an update of the first version of the table, wherein the abort indicator makes the second version of the table obsolete and the first version of the table available to the host, and wherein the commit indicator processes the second version of the table based on whether a transaction is a non-nested transaction or a nested transaction.

28. The device of claim 27, further comprising means for reserving the first set of logical addresses, the second set of logical addresses, and the third set of logical addresses for storing multiple versions of one or more pages of the table without reserving physical memory blocks for multiple versions of the first page of the table.

29. The device of claim 27, wherein the table comprises a byte table, and further comprising means for receiving a table update request that identifies a byte value of the byte table.

30. The device of claim 27, further comprising means for determining whether to commit or abort the updated second data structure.

* * * * *